(12) United States Patent
Nakata et al.

(10) Patent No.: US 6,270,860 B1
(45) Date of Patent: Aug. 7, 2001

(54) METHOD OF MAKING PUSH BUTTON SWITCH COVERING WITH PROTECTIVE COATING

(75) Inventors: Toshihiro Nakata; Norio Suzuki, both of Nagano-ken (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 0 days.

(21) Appl. No.: 08/428,820

(22) Filed: Apr. 25, 1995

(30) Foreign Application Priority Data

Apr. 26, 1994 (JP) .................................................. 6-088358

(51) Int. Cl.$^7$ ....................................................... H05H 1/00
(52) U.S. Cl. .......................... 427/536; 427/322; 427/387; 427/407.1; 427/539; 427/569; 427/578
(58) Field of Search ..................................... 427/536, 322, 427/387, 407.1, 539, 569, 578

Primary Examiner—Bernard Pianalto
(74) Attorney, Agent, or Firm—Wenderoth, Lind & Ponack

(57) ABSTRACT

A push button switch covering member of a silicone rubber is imparted with excellent resistance against stain deposition and abrasive wearing by providing a protective overcoating layer of a urethane resin-based coating composition capable of being cured by forming urethane linkages between isocyanate groups of a polyisocyanate compound and hydroxy groups of a polyhydroxy compound. The coating procedure with the coating composition on the surface of a silicone rubber-made covering member is preceded by a plasma treatment so as to activate the surface resulting in an increased adhesive bonding strength between the silicone rubber body and the coating layer. The improvement is more remarkable when the plasma-activated surface is subjected to a priming treatment with a silane coupling agent and coating with the coating composition is undertaken as soon as possible or within 60 minutes after completion of the plasma treatment.

4 Claims, 3 Drawing Sheets

METHOD OF MAKING PUSH BUTTON SWITCH COVERING WITH PROTECTIVE COATING

BACKGROUND OF THE INVENTION

The present invention relates to a push button switch covering member made from a silicone rubber and having a protective coating layer on the surface thereof and a method for the preparation thereof. More particularly, the invention relates to a push button switch covering member of silicone rubber provided at least on the outwardly facing surface thereof with a coating layer to serve for protection against stain and abrasive wearing as well as a reliable method for the preparation thereof.

A push button switch covering member, referred to simply as covering member hereinafter, made from a rubber or, in particular, silicone rubber has a structure consisting of a base plate and a dome-like raised portion of a relatively small thickness having a riser part rising on the base plate and a flat key top. Such covering members are widely used in various kinds of electric and electronic instruments as an essential constituent of a push button switch consisting of a substrate plate on which an electrode as the fixed contact point is provided and a covering member mounted on the substrate plate which is provided with a movable contact point on the lower surface of the key top at a position to face the fixed contact point on the substrate plate. When the key top of the dome-like portion is pushed down with a finger tip and the like, buckling of the riser part is caused so that the movable contact point on the lower surface of the key top is brought into contact with the fixed contact point on the substrate plate so as to close the electric circuit.

As a modern design of such a covering member, the key top of the covering member generally made from a light-shielding rubber is provided with a light-transmitting area to serve as indicia to exhibit a letter, numerical figure, sign and the like indicating the function of the particular push button switch with a lighting means inside of the dome-like portion of the covering member to illuminate the light-transmitting indicia from inside so that the push button switch can be readily recognized even in a very dark environment. For example, the covering member as a whole is made from a transparent rubbery material and the outer surface thereof is coated with a light-shielding ink or paint compounded with carbon black or titanium dioxide filler leaving certain areas of the key top in the form of the desired indicia. Several modifications have been proposed and are under practical use for such a covering member having indicia in the key top having visibility even in a dark place.

When such a covering member having a light-shielding coating layer on the outer surface thereof is used for long-term service by pushing many times with a finger tip, a trouble is unavoidably caused that the light-shielding coating layer is abrasively worn out by rubbing with finger tips, clothes of the switch operator and dust particles having a high hardness such as sand particles deposited thereon so as to greatly decrease the recognizability of the indicia provided on the key top if not to mention the degradation in the aesthetic value of the device or instrument as a whole.

Proposals and attempts of course have been made to solve this problem. For example, Japanese Patent Kokai No. 4-96942 proposes to coat the surface of the covering member having a light-shielding coating layer with a non-silicone organic resinous material to form a protective layer. This method, however, has a disadvantage that, especially when the underlying light-shielding coating layer is made from a silicone-based coating composition compounded with a large amount of carbon black, the adhesive bonding between the underlying light-shielding coating layer and the protective overcoating layer cannot be high enough as a consequence of the unique surface properties of silicone materials in general usually exhibiting surface releasability. Although the adhesive bonding strength between layers in general can be improved by the use of a so-called silane coupling agent as a primer, no silane coupling agent is known which is fully effective for the combination of the resinous materials in this case if not to mention the problem inherent in the use of an amino group-containing organosilane compound as the primer due to eventual yellowing in the long-run use of the covering member.

SUMMARY OF THE INVENTION

The present invention accordingly has an object to provide a novel and improved push button switch covering member of silicone rubber having an overcoating layer to serve as an anti-stain and anti-abrasion protective layer to be freed from the above described problems and disadvantages in the prior art covering members.

Thus, the present invention provides a push button switch covering member having a protective overcoating layer on the outwardly facing surface of a push button switch covering member made from a silicone rubber, in which the protective overcoating layer is formed from a cured organic resin-based coating composition crosslinked by forming urethane linkages between isocyanate groups of a polyisocyanate compound and hydroxy groups of a polyhydric organic compound, the surface of the covering member being activated by exposure to plasma prior to coating with the coating composition.

The adhesive bonding strength between the above mentioned protective overcoating layer and the underlying surface can be very firm when the push button switch covering member of silicone rubber is provided with the protective overcoating layer by the following method of the invention. Namely, the present invention provides a method for the preparation of a push button switch covering member of a silicone rubber provided with a protective overcoating layer which comprises the steps of:

(a) exposing the outwardly facing surface of a push button switch covering member made from a silicone rubber to plasma generated in a gaseous atmosphere so as to activate the surface;

(b) coating the thus plasma-activated surface of the push button switch covering member made from a silicone rubber with a reactive organic resin-based coating composition curable by forming crosslinks of urethane linkages between isocyanate groups of a polyisocyanate compound and hydroxy groups of a polyhydric organic compound to form a coating layer of the coating composition; and (c) subjecting the coating layer of the coating composition to curing.

In particular, the adhesive bonding strength between the protective coating layer and the underlying surface can be further enhanced when the plasma-activated surface of the push button switch covering member in step (a) is, prior to coating with the organic coating composition in step (b), coated with an organosilane compound represented by the general formula $$X\text{---}Si(CH_3)_{3-n}(OR)_n, \qquad (I)$$

in which R is a methyl group or an ethyl group, X is an organic group having a functional group selected from the class consisting of a vinyl group, methacryloxy group, epoxy group, amino group and mercapto group and the subscript n is 2 or 3.

DETAILED DESCRIPTION OF THE PREFERRED EMBODIMENTS

Figure 3A:
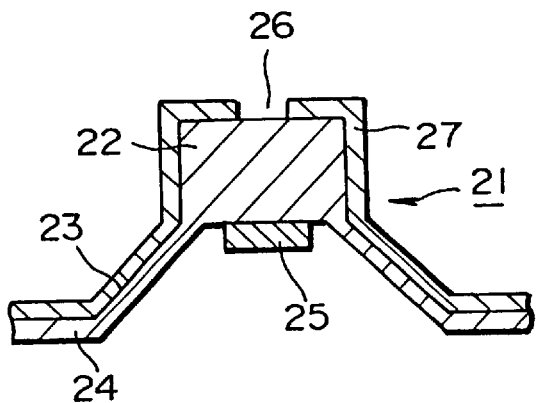
FIGS. 3a, 3b, 3c and 3d are each an axial cross sectional view of a conventional rubber-made push button switch covering member of different designs.
Figure 3B:
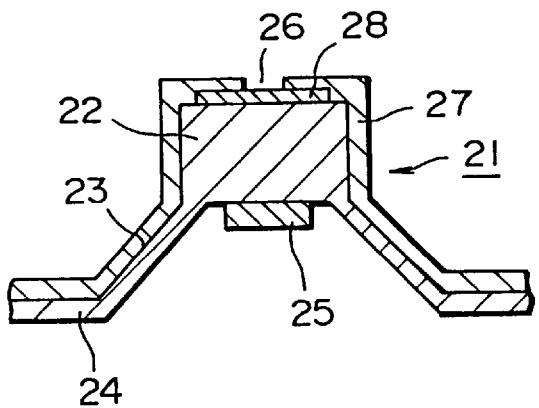
Figure 3C:
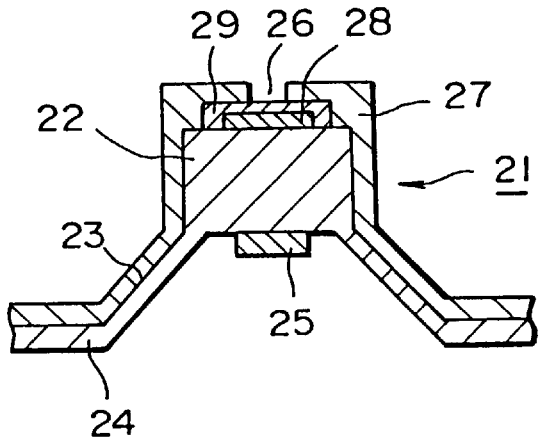
Figure 3D:
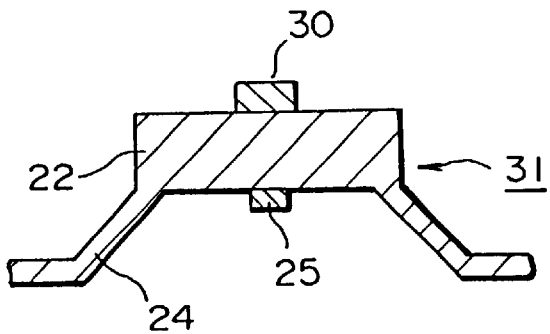

FIGS. 3a to 3d each illustrate a conventional covering member of rubber by an axial cross sectional view, of which FIG. 3a is for a covering member 21 having an internally illuminable light-transmitting area 26 which consists of a base plate 24, riser part 23, key top 22 provided with a contact point 25 on the downwardly facing surface and light-shielding coating layer 27 covering all over the surface excepting the area 26 in the form of desired indicia. The covering member 21 illustrated in FIG. 3b is similar to the above but is provided with a colored light-transmitting layer 28 between the key top 22 and the top part of the light-shielding coating layer 27 so as to enable recognition of the indicia not only by the internal illumination but also by means of the color different from those of other covering members. The covering member 21 illustrated in FIG. 3c is again similar to that illustrated in FIG. 3b except that a transparent protective layer 29 is provided on the colored light-transmitting layer 28. Further, the covering member 31 illustrated in FIG. 3d is not provided with a light-shielding coating layer on allover the surface but the indicia 30 can be formed by writing or printing with a light-shielding ink or paint.

Figure 1A:
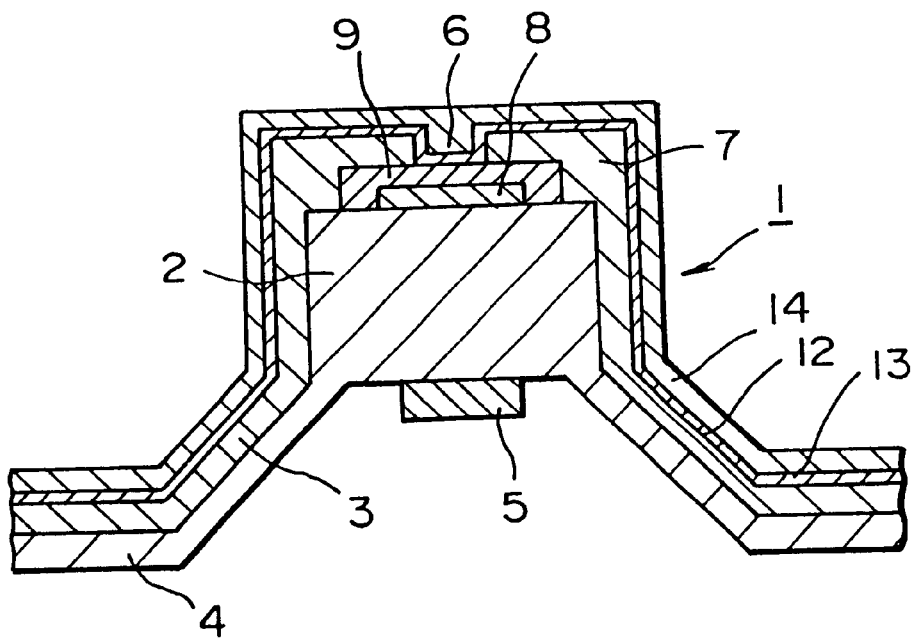
FIG. 1a is an axial cross sectional view of an internally illuminable push button switch covering member of the invention and FIG. 1b is an axial cross sectional view of a non-illuminable push button switch covering member of the invention.
Figure 1B:
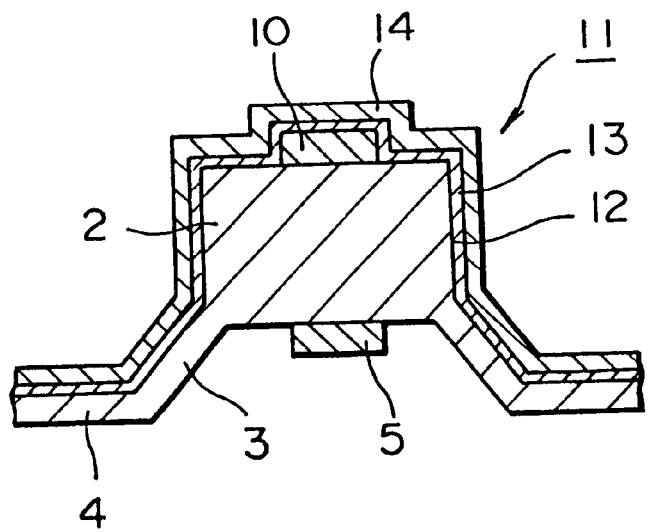

In contrast to the above described conventional covering members, as is illustrated in FIGS. 1a and 1b each by an axial cross sectional view, the inventive covering member 1, 11 is provided on the light-shielding coating layer 7 or directly on the base body, respectively, with a protective coating layer 14 of a specific coating resin composition which protects the light-shielding layer 7 or the base body from stain and wearing by rubbing.

The base body of the inventive covering member is shaped from a silicone rubber by the method of compression molding, injection molding or other known molding method and the general form thereof is not particularly different from those illustrated in FIGS. 3a to 3d consisting of a base plate 4, riser part 3 and key top 2 and a movable contact point 5 is integrally formed on the lower surface of the key top 2. Different from conventional covering members illustrated in FIGS. 3a to 3d, a protective coating layer 14 is formed directly on the base body (FIG. 1b) or on the light-shielding coating layer 7 (FIG. 1a).

In the preparation of the covering member of the invention having the protective coating layer 14, the base body of silicone rubber, either with or without a light-shielding coating layer 7, is first subjected to a surface-activating treatment by exposure to an atmosphere of plasma of various kinds of gases such as air, nitrogen, oxygen, carbon dioxide, sulfur dioxide, nitrogen monoxide, argon, neon and carbon tetrafluoride as well as hexamethyl disiloxane, propane epoxy and the like, of which nitrogen, oxygen, argon, neon and carbon tetrafluoride are preferred in respect of the influences on the environment and easiness in handling. More preferably, the plasma is generated in an atmosphere of a gaseous mixture consisting of oxygen and nitrogen, oxygen and argon or oxygen and carbon tetrafluoride. A gaseous mixture of oxygen and argon is most preferable when the underlying layer is made from a material compounded with a large amount of carbon black in respect of the wettability. It should be noted that a trouble is sometimes caused, when the covering member is provided with a contact point of a conductive rubber compounded with carbon black and the plasma atmosphere contains oxygen as a reactive species, that the surface-activating effect by the plasma treatment is so great that the contact resistance on the contact point is increased leading to unreliableness of electric contacting. This trouble can be avoided by decreasing the energy of plasma generation or by decreasing the concentration of oxygen in the gaseous mixture. In short, the gaseous mixture for the plasma atmosphere should be selected in accordance with the nature of the material forming the underlying layer. For example, the plasma treatment of a covering member having a contact point is performed in an atmosphere of a non-reactive species such as argon or a mixture of argon with air. While it is not advantageous to directly introduce polar groups to the plasma-treated surface, the free radicals formed on the plasma-treated surface react subsequently with oxygen in the air or in the oxygen-containing gaseous atmosphere resulting indirect introduction of polar groups so that the troubles on the contact point can be alleviated or avoided.

The plasma for the surface-activating treatment is preferably low-temperature plasma in view of the adverse influences on the polymeric materials when the plasma treatment is performed at high temperatures. Low-temperature plasma is fully effective to activate the surface by introducing polar groups thereto. The effectiveness of the plasma treatment is not affected even when the treated body has a complicated configuration as a merit of the reaction in a gaseous phase.

The procedure for the plasma treatment is well known. For example, a plasma chamber is filled with a gaseous mixture of, e.g., oxygen and argon under a pressure of 0.1 hPa to 1.0 hPa and a high-frequency electric power of 100 watts to 1000 watts is supplied to the electrodes to generate plasma inside of the plasma chamber to which the body is exposed for 30 seconds to 30 minutes. Although the activity of the surface imparted by the plasma treatment is not subject to rapid decay even when the plasma-treated covering body is taken out of the plasma chamber and brought in the atmosphere of air, it is desirable that the plasma-treated surface is coated with the specific coating composition as soon as possible within 60 minutes or, preferably, within 40 minutes in order to avoid possible decay in the surface activity.

The surface activity obtained by the plasma treatment can be assessed by the method of wettability test using a wetting agent. When water is used as the wetting agent, spreading of the water drop put on the surface indicates that the surface has hydrophilicity so as to overcome the surface tension 72 mN/m of water. When the water drop put on the surface retains the form of a drop of water without full spreading, the surface activation is insufficient leaving repellency.

Figure 2:
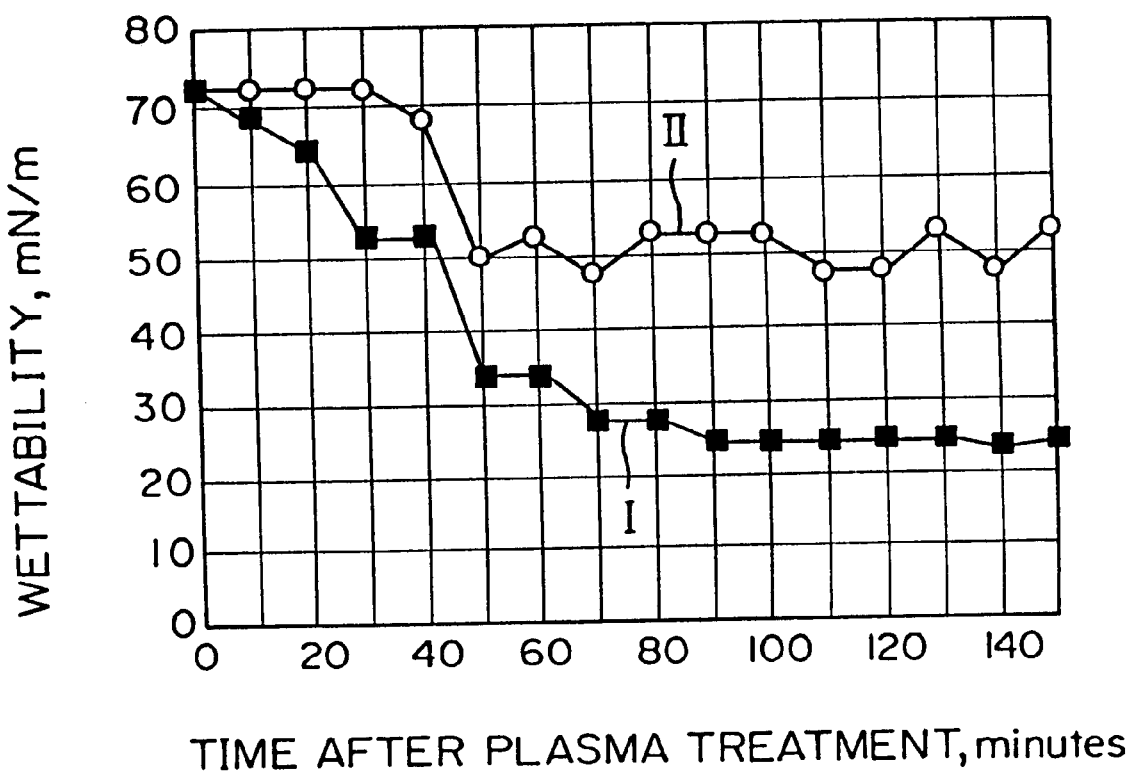
FIG. 2 is a graph showing decrease of the wettability of a silicone rubber surface in the lapse of time after a plasma treatment.

FIG. 2 of the accompanying drawing is a graph showing the decay in the hydrophilicity of the surface in the lapse of time after completion of the plasma treatment in an example. The curve I is for the surface of a colored light-shielding coating layer, according to which the hydrophilicity, once enhanced to 72 mN/m by the plasma treatment, drops to the value of 25 mN/m, which is the value before the plasma treatment, after 140 minutes from completion of the plasma treatment. The curve II is for the surface of the base body of a silicone rubber, according to which the hydrophilicity, enhanced to 72 mN/m by the plasma treatment, drops to the value of 50 mN/m, which is the value before the plasma treatment, after 140 minutes from completion of the plasma treatment. These results indicate that the coating work of the plasma-treated surface should desirably be performed as soon as possible before substantial decrease in the surface activity in order to ensure high adhesive bonding between the plasma-treated surface and the coating layer.

The next step in the preparation of the inventive covering member with a protective coating layer is coating of the thus plasma-treated surface of the base body with a specific reactive coating composition capable of being cured by forming crosslinks with urethane linkages. The principal ingredient in the coating composition is a polyisocyanate compound having at least two isocyanato groups in a molecule exemplified by tolylene-2,4-diisocyanate, tolylene-2,6-diisocyanate, 3,3'-bitolylene-4,4'-diisocyanate, diphenylmethane-4,4'-diisocyanate, 3,3'-dimethyl diphenylmethane-4,4'-diisocyanate, m-phenylene diisocyanate, triphenylmethane triisocyanate, dimer of tolylene-2,4-diisocyanate, hexamethylene diisocyanate, naphthalene-1,5-diisocyanate and the like. The polyisocyanate compound, which is usually supplied in a separate package from the polyol compound, reacts with the polyol compound to form urethane linkages so as to effect curing of the coating layer. Examples of suitable polyol compounds include alkyd polyols, polyester polyols and acrylic polyols as well as epoxy-modified derivatives, polyester-modified derivatives and polyurethane-modified derivatives thereof.

The above mentioned urethane resin-based coating composition is formulated preferably to have a NCO:OH ratio in the range from 1.2:1.0 to 0.8:10 by moles. When this ratio is too large, for example, to exceed 5.0:1.0, the coating layer formed by curing is too rigid and brittle so as to affect the flexibility of the coated covering member. It is of course that this ratio is selected in consideration of various factors such as the types of the covering member, intended application field thereof and so on. It is optional that the coating composition is compounded with various kinds of known additives including coloring agents, fillers to serve as a matting agent such as urethane beads and silica fillers, settling inhibitors, solvents such as aromatic hydrocarbon solvents and so on.

Curing of the above described urethane resin-based coating composition proceeds by the reaction between the isocyanato groups —NCO and the hydroxy groups —OH to form urethane linkages as a crosslinking site in the coating layer. The urethane resin-based coating composition is particularly advantageous, in addition to the quick driability, in respects of the high adhesive bonding strength to the substrate surface, resistance against chemicals and resistance against wearing by rubbing. The isocyanate groups in the polyisocyanate compounds having high polarity and reactivity react with the surface groups on the substrate having active hydrogen possibly leading to formation of a chemical primary bond along with the anchoring effect as a consequence of the relatively low molecular weight and the crosslinked structure contributing to the adhesive bonding strength between layers.

The thickness of the protective coating layer is preferably in the range from 5 μm to 100 μm after curing. When the thickness is too small, the desired protective effect cannot be fully exhibited in addition to the adverse influences on the gloss of the surface and touch feeling to the operator's finger tips. When the thickness is too large, the flexibility of the dome-like portion of the covering member is decreased so that the working load for pushing the key top is unduly increased to cause early fatigue of the operator's fingers. The surface gloss of the protective coating layer can be freely controlled according to desire by adjusting the compounding amount of fillers such as urethane beads and silica powders.

It is sometimes advantageous that the urethane resin-based coating composition is admixed with an organic peroxide together with an ethylenically unsaturated polymerizable monomeric compound so that free radicals are produced by heating at a temperature of, for example, 100° C. or higher from the organic peroxide to provide active sites for the initiation of graft copolymerization so that the stability of the protective coating layer can be further enhanced.

It is advantageous that, prior to coating with the urethane resin-based coating composition, the plasma-treated surface is subjected to a priming treatment by applying a so-called silane coupling agent as a primer. The silane coupling agent is represented by the general formula

$$X-Si(CH_3)_{3-n}(OR)_n, \quad (I)$$

in which R is a methyl group or an ethyl group, X is an organic group having a functional group selected from the class consisting of a vinyl group, methacryloxy group, epoxy group, amino group and mercapto group and the subscript n is 2 or 3. Examples of suitable silane coupling agents include: vinyl triethoxy silane, vinyl tris(β-methoxyethoxy) silane, vinyl trimethoxy silane, 3-methacryloxypropyl trimethoxy silane, 3-glycidyloxypropyl trimethoxy silane, 2-(3,4-epoxycyclohexyl)ethyl trimethoxy silane, N-β-(aminoethyl)-γ-aminopropyl trimethoxy silane, N-β-(aminoethyl)-γ-aminopropyl methyl dimethoxy silane, N-phenyl-γ-aminopropyl trimethoxy silane, 3-mercaptopropyl trimethoxy silane, 3-chloropropyl trimethoxy silane and the like.

The above described primer compound is applied to the plasma-treated surface before coating with the urethane resin-based coating composition either as such or as diluted with a suitable solvent such as an alcohol, mixture of an alcohol with water, toluene, xylene, methyl ethyl ketone and the like followed by drying to form a primer layer 13. A further improvement can be obtained by this primer treatment in the adhesive bonding strength of the protective coating layer to the substrate surface.

FIG. 1a of the accompanying drawing illustrates an example of the inventive covering member 1 of the internally illuminable type by an axial cross sectional view, which consists of a key top 2, dome-like riser part 3, base plate 4, electroconductive contact point 5 on the lower surface of the key top 2, light-transmitting area 6, colored light-shielding layer 7, colored light-transmitting layer 8 and light-transmitting protective layer 9 provided thereon with a plasma-activated surface layer 12, primer layer 13 and protective coating layer 14 of a urethane resin-based coating composition. FIG. 1b illustrates another example of the inventive covering member, which is not of the internally illuminable type, with a protective coating in which the indicia 10 are formed, instead of the indicia area 6 formed from the colored light-transmitting layer 8 and light-transmitting protective layer 9 in FIG. 1a, by printing with a light-shielding ink while the colored light-shielding layer 7 in FIG. 1a is omitted.

In the following, the present invention is described in more detail by way of examples and comparative examples, in which the term of "parts" always refers to "parts by weight". The covering member with a protective coating layer prepared in these examples and comparative examples were evaluated for the items including the adhesive bonding strength and scratch resistance of the coating layer and the flexibility of the covering member by the testing procedures described respectively in the following.

Adhesive bonding strength of the coating layer:

Incision lines in a checkerboard-like fashion were made using a sharp knife with 1 mm distances from the adjacent incision lines in the down and across directions into the coating layer, on to which a cellophane-based pressure-sensitive adhesive tape was applied and press-bonded, which was, after standing for 1 minute as such, quickly removed from the surface to count the number of the 1 mm by 1 mm square sections per 100 sections of the coating layer left unremoved by being carried away by the adhesive tape.

Resistance against scratching:

The surface of the coating layer was repeatedly scratched with a nail under a load of 500 g and the results were recorded as A when no peeling of the coating layer was found even 10 times or more of repeated scratching and as B when peeling of the coating layer was found before 10 times of scratching.

Flexibility:

An organoleptic test was undertaken to record the results as A and B for good and poor flexibility, respectively.

EXAMPLE 1

An electroconductive curable silicone rubber molding composition was prepared by mixing 100 parts of a silicone rubber stock (KE 78VBS, a product by Shin-Etsu Chemical Co.), 40 parts of carbon black and 2 parts of a curing agent for the silicone rubber (C-8, a product by the same company, supra) and the composition was compression-molded in a metal mold at 180° C. under a pressure of 200 kg/cm$^2$ to prepare a disk-formed piece for the electroconductive contact point having a diameter of 4 mm and a thickness of 0.5 mm. Separately, a transparent electrically insulating silicone rubber composition was prepared by mixing 100 parts of a silicone rubber stock (KE 951U, a product by the same company, supra) and 0.5 part of a curing agent for the silicone rubber (C-8B, a product by the same company, supra).

The electroconductive piece of cured silicone rubber prepared above was put in place in a metal mold for a covering member, which was filled with the transparent silicone rubber composition to be subjected to compression-molding at 180° C. under a pressure of 200 kg/cm$^2$ to prepare a base body of covering member consisting of a key top 2, riser part 3, base plate 4 and contact point 5.

The surface of the key top 2 of the above prepared base body was coated by screen printing with a white paint prepared by admixing 100 parts of a silicone-based coating composition (Silmark, a product by the same company, supra) with 23 parts of a white pigment in a thickness of about 10 μm still to permit transmission of light followed by heating at 200° C. for 30 minutes to form a colored light-transmitting layer 8. Further, a light-transmitting protective layer 9 was formed on the above formed colored light-transmitting layer 8 by screen printing with a transparent coating composition prepared by admixing a silicone-based coating composition (Silcoat S, a product by the same company, supra) with 34 parts of Silmark (supra) and 12 parts of a silica filler in a thickness of 30 μm followed by baking at 200° C. for 30 minutes to effect firm bonding of the layers.

In the next place, a light-shielding coating layer 7 was formed thereon by air-spraying in a thickness of 50 μm with a silicone-based black coating composition prepared by mixing 100 parts of Silmark (supra), 300 parts of toluene, 8 parts of a curing agent (KF 99, a product by the same company, supra) and 0.03 part of a curing catalyst (Cat-PL-2, a product by the same company, supra) followed by baking at 200° C. for 30 minutes to effect firm bonding of the layers.

Further thereafter, a profile of indicia such as letters, numerical figures, signs and symbol marks was formed in the light-shielding coating layer 7 by using a laser-beam engraver with a neodymium-activated YAG laser followed by conditioning at 200° C. for 1 hour in a hot-air oven to complete a covering member.

The thus prepared covering member was set in a plasma chamber in which the atmosphere was kept under a pressure of 0.1 hPa by continuously introducing oxygen and argon at rates of 40 ml/minute and 12 ml/minute, respectively with concurrent evacuation and a high-frequency electric power of 200 watts was applied to the electrodes for 30 seconds so as to effect plasma-induced surface activation. The covering member taken out of the plasma chamber was immediately coated uniformly on the activated surface with a 50% by weight toluene solution of an epoxysilane as a silane coupling agent (KBM 403, a product by the same company, supra) by spraying for the priming treatment.

Separately, a urethane resin-based coating composition was prepared by mixing the contents of a two-package type commercial high-elasticity urethane resin-based coating composition (Fantascoat SF-6, a product by Origin Electric Co.) consisting of 40 parts and 10 parts of a principal agent and an auxiliary agent, respectively, with 10 parts of a thinner solvent and 2 parts of an organic peroxide (Perhexa V, a product by Nippon Oil & Fat Co.). The plasma-activated and primer-treated surface of the covering member was coated with this coating composition by spraying followed by baking at 140° C. for 1 hour in an air oven to give a covering member 1 provided with a protective coating layer 14 of 50 μm thickness according to the invention. The results of the evaluation tests for this protective coating layer were:

"100/100" in the adhesive bonding strength test;

"A" in the scratch resistance test; and

"A" in the flexibility test.

EXAMPLE 2

A metal mold was filled with a curable silicone rubber composition prepared by mixing 100 parts of a silicone rubber stock (KE 951U, supra), 50 parts of carbon black and 2 parts of 2,5-dimethyl-2,5-di(tert-butylperoxy) hexane as a curing agent and the rubber composition was compression-molded at 180° C. under a pressure of 200 kg/cm$^2$ to give a disk-formed piece having a diameter of 4 mm and a thickness of 0.5 mm to serve as a contact point. This disk-formed piece of electroconductive silicone rubber was put in place in a metal mold which was filled with a green-colored curable silicone rubber composition prepared from 100 parts of a silicone rubber stock (KE 951U, supra), 5 parts of a green pigment (SR Color Green, a product by Shin-Etsu Chemical Co.) and 2.5 parts of 2,5-dimethyl-2,5-di(tert-butylperoxy) hexane. The silicone rubber composition was compression-molded at 180° C. under a pressure of 150 kg/cm$^2$ to give a base body of a covering member consisting of a key top 2, riser part 3, base plate 4 and contact point 5 as is illustrated in FIG. 1b.

Thereafter, screen printing was performed with a white painting composition prepared from 100 parts of Silmark (supra) with admixture of 20 parts of a white pigment to form an indicia area 10 on the top surface of the key top 2 in a thickness of 30 μm followed by baking at 200° C. for 60 minutes to effect adhesive bonding of the indicia layer to the underlying surface. The thus prepared covering member was subjected to a plasma treatment in substantially the same manner as in Example 1 except that the process gas was oxygen alone introduced into the plasma chamber at a rate of 40 ml/minute, the pressure of the plasma atmosphere was 0.3 hPa, the high-frequency electric power was 300 watts and the treatment was performed for 60 seconds. After completion of the plasma treatment, the covering member taken out of the plasma chamber was immediately coated by spraying with a 30% by weight toluene solution of an aminosilane primer (KBP-40, a product by the same company, supra) on the outwardly facing surface followed by drying.

The thus primer-treated surface of the covering member was coated by spraying with a urethane resin-based coating composition prepared by mixing the contents of a two-package type commercial urethane resin-based coating composition (Rubbasan, a product by Musashi Paint Co.) consisting of 40 parts and 10 parts of a principal agent and an auxiliary agent, respectively, with 10 parts of a thinner solvent and 4 parts of an organic peroxide (Perhexa V, supra) in a coating thickness of 40 μm as dried followed by baking at 150° C. for 40 minutes in an air oven to give a covering member 11 of the non-illuminable type provided with a protective coating layer 14 as is illustrated in FIG. 1b according to the invention. The results of the evaluation tests for this protective coating layer were:

"100/100" in the adhesive bonding strength test;

"A" in the scratch resistance test; and

"B" in the flexibility test.

COMPARATIVE EXAMPLES 1 to 3

An internally illuminable covering member with a protective overcoating layer was prepared in each of these comparative examples in the same manner as in Example 1 excepting:

in Comparative Example 1, omission of the plasma treatment of the surface of the base body and omission of the primer treatment;

in Comparative Example 2, omission of the plasma treatment of the surface of the base body but with the use of the same epoxy silane for the primer treatment; and in Comparative Example 3, omission of the plasma treatment of the surface of the base body but with the use of the same amino silane as in Example 2 for the primer treatment in place of the epoxy silane.

The results of the evaluation tests for these comparative covering members were as tabulated below.

| Comparative Example | Adhesive bonding strength | Scratch resistance | Flexibility |
| --- | --- | --- | --- |
| 1 | 0/100 | B | A |
| 2 | 10/100 | B | A |
| 3 | 20/100 | B | B |

What is claimed is:

1. A method for the preparation of a push button switch covering member of a silicone rubber provided with a protective overcoating layer which comprises the steps of:

(a) exposing the outwardly facing surface of a push button switch covering member made from a silicone rubber to a plasma generated in an atmosphere of a gas so as to activate the surface;

(b) coating the thus plasma-activated surface of the push button switch covering member made from a silicone rubber with a reactive organic resin-based coating composition curable by forming crosslinks of urethane linkages between isocyanate groups of a polyisocyanate compound and hydroxy groups of a polyhydric organic compound to form a coating layer of the coating composition; and (c) subjecting the coating layer of the coating composition to curing.

2. The method for the preparation of a push button switch covering member of a silicone rubber provided with a protective overcoating layer as claimed in claim 1 in which the gas for the generation of plasma is a mixture of oxygen and nitrogen, oxygen and argon or oxygen and carbon tetrafluoride.

3. The method for the preparation of a push button switch covering member of a silicone rubber provided with a protective overcoating layer as claimed in claim 1 in which coating of the plasma-activated surface with the coating composition in step (b) is performed within 60 minutes after completion of the plasma treatment in step (a).

4. The method for the preparation of a push button switch covering member of a silicone rubber provided with a protective overcoating layer as claimed in claim 1 in which coating of the plasma-activated surface after step (a) with the coating composition in step (b) is preceded by a treatment of the surface with a primer which is an organosilane compound represented by the general formula

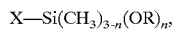

X—Si(CH$_3$)$_{3-n}$(OR)$_n$, in which R is a methyl group or an ethyl group, X is an organic group having a functional group selected from the class consisting of a vinyl group, methacryloxy group, epoxy group, amino group and mercapto group and the subscript n is 2 or 3.

* * * * *